United States Patent [19]

Smith

[11] Patent Number: 4,900,617

[45] Date of Patent: Feb. 13, 1990

[54] MASKING COMPOSITIONS

[75] Inventor: Jonathan H. Smith, London, England

[73] Assignee: Sericol Group Limited, London, England

[21] Appl. No.: 181,421

[22] Filed: Apr. 14, 1988

[30] Foreign Application Priority Data

Apr. 15, 1987 [GB] United Kingdom ............... 8709043

[51] Int. Cl.$^4$ .................... C08J 9/32; C08L 31/02; C08L 27/00

[52] U.S. Cl. .................... 428/325; 523/219; 273/139; 273/148 R; 524/297; 524/321; 524/426; 524/441; 524/563; 524/567; 524/569; 524/575

[58] Field of Search ............... 523/219; 428/916, 325; 273/138 R, 148 R, 139; 524/297, 321, 426, 441, 563, 567, 569, 575

[56] References Cited

U.S. PATENT DOCUMENTS

| | | | |
|---|---|---|---|
| 3,418,896 | 12/1968 | Rideout | 523/219 |
| 3,642,675 | 2/1972 | McKenzie | 523/219 |
| 3,711,321 | 1/1973 | Hibbert et al. | 117/119.6 |
| 4,374,886 | 2/1983 | Raghava | 428/172 |
| 4,540,628 | 9/1985 | Oberdeck et al. | 428/336 |
| 4,643,464 | 2/1987 | Ondis | 283/74 |

FOREIGN PATENT DOCUMENTS

| | | | |
|---|---|---|---|
| 0026179 | 3/1978 | Japan | 523/219 |
| 3056570 | 3/1988 | Japan | 523/219 |
| 0595340 | 2/1978 | U.S.S.R. | 523/219 |

*Primary Examiner*—Herbert J. Lilling
*Attorney, Agent, or Firm*—Bacon & Thomas

[57] ABSTRACT

This invention relates to compositions for forming opaque, abrasion-removable masks on substrates. The compositions, which include a texture modifying amount of solid or hollow microspheres, have enabled depression or embossing of the surface of the printed substrates to be obscured so that they cannot be seen by the naked eye. The compositions can be based on plastisols, pigmented polymer solution, or pigmented aqueous emulsions. The invention further provides substrates, for example lottery tickets, having abrasion-removable masks formed from compositions of the invention.

9 Claims, No Drawings

MASKING COMPOSITIONS

MASKING COMPOSITIONS

This invention relates to compositions for forming opaque, abrasion-removable masks on substrates, the substrate being, for example in the form of a lottery ticket.

Lottery ticket having removable masks are known in which complete removal of an opaque mask or selective removal of several masked areas from a number of masks on a ticket reveals a prize-winning combination, often for a substantial cash prize.

Such tickets have hitherto been produced by first printing various indicia on a substrate, normally paper or card, by lithography or other means. The quantity of ink used to produce such indicia is small, and this leads to a deposit of insignificant thickness. The indicia are generally coated with a protective layer of a transparent varnish which serves to protect them and also to aid removal of the subsequently applied opaque, abrasion-removable mask applied to disguise the presence or otherwise of a winning combination of indicia.

The printing of these indicia by lithography, gravure, flexographic or other conventional printing process requires the production of a large number of plates or other data producing media in order that a complete lottery may be printed. This incurs high cost and undue delay. The use of computer printers, for example in the form of electro-mechanical dot matrix printers and laser printers, offers a solution to this problem because a complete lottery, winners and losers alike, can be programmed into the computer memory, and the complete lottery can then be printed without interruption. The problem that arises from the use of computer printers is that they often cause depressions in or embossing of the surface of the substrate, so that the indicia applied by these means may be readily seen after the subsequent application of a varnish and a conventional opaque, abrasion-removable mask, thus nullifying the funciton of the mask.

According to the present invention there is provided a composition for forming an abrasion-removable mask on a substrate, the composition including a texture modifying amount of microspheres.

The invention further provides a substrate having an abrasion-removable mask thereon, the mask including a texture-modifying amount of microspheres.

The incorporation of microspheres, which can be fine beads or hollow spheres of glass, ceramic or a polymeric material, or mixtures thereof, into compositions for forming abrasion-removable masks has enabled depressions or embossing of the surface of the printed substrates to be obscured so that disruptions of the surface of the substrate cannot be seen by the naked eye. This can be achieved with compositions of various types, for example those based on plastisols, pigmented polymer solutions, or pigmented aqueous emulsions.

The compositions of the invention will in general contain a pigment which serves to obscure the indicia over which they are printed. Optionally, extenders can be included to adjust the rheology, removal characteristics and surface finish of the resultant masks. The pigment can be metallic, for example flake aluminum metal powder or paste, or bronze powder, or a pigment compound, for example titanium dioxide. Where the pigment contains an aluminum paste, the paste is preferably of a type formed from aluminum powder and some dampening liquid such as white spirit or di-(2-ethylhexyl) phthalate. Insoluble dyestuffs can also be included to impart a desired color to the composition.

Examples of extenders which can be used include barium sulfate, calcium carbonate, silicon dioxide, silicates, zinc sulfide, alumina, magnesia and mica.

Where the compositions are in the form of a plastisol, they will in general be formed from a liquid plasticizer and at least one synthetic homopolymer or copolymer.

Examples of suitable plasticizers include esters of phthalic, phosphoric or sebacic acids with alcohols containing from 4 to 13 carbon atoms, or polyesters derived from adipic, sebacic or azelaic acid and a glycol, or a chlorinated paraffin.

Suitable synthetic polymers include polyvinyl chloride and vinyl chloride/vinyl acetate copolymers. The synthetic polymer can also be used in conjunction with at least one extender polymer to adjust the flow characteristics of the compositions.

The ratio of synthetic polymer to plasticizer can be varied as desired to provide masks having a range of hardness and/or removability characteristics.

Although a solvent or diluent can be included in compositions of the invention which are in the form of a plastisol, it is preferred not to use an organic solvent since solvent release may be undesirable, for example if substrates having masks thereon are to be packaged with foodstuffs. When a solvent or diluent is used, it should not be present in an amount which adversely affects the properties of masks produced therefrom.

The pot-life of compositions of the invention in the form of plastisols can be extended by the inclusion of a stabilizer, for example epoxy, organotin, or Ba/Cd or Pb/Cd compounds.

Where the composition is a polymer solution, the polymer is preferably an elastomer formed by the copolymerization of buta-1,3-diene and styrene, although polyisoprene can be used.

Where the composition is an aqueous emulsion, this is preferably an emulsion of an elastomeric polymer, examples of which include copolymers of buta-1,3-diene and styrene, polyurethanes, and natural rubber latices. With such emulsions it may be desirable, though by no means necessary, to include a hard resin, for example a styrene and maleic anhydride copolymer, in order to modify the hardness and removal properties of the resultant masks.

Where the composition is in the form of a polymer solution, the solvent is preferably an aromatic hydrocarbon containing nine carbon atoms or mixtures thereof. However, other aromatic hydrocarbons can be used, and different solvent types, for example aliphatic hydrocarbons, the solvent being selected, for example, to adjust such properties as drying speed and odour of the applied composition.

The weight average particle size of the microspheres is preferably up to 120 microns, and more particularly from 15 to 60 microns, and advantageously about 30 microns. Since solid microspheres can be used, there is no maximum wall thickness for the hollow microspheres, but a wall thickness of 0.5 to 2 microns is preferred.

The amount of microspheres in the compositions should be sufficient to provide the required degree of disruption of the surface of the dried or cured opaque, abrasion-removable mask to prevent reading of printed indica thereunder by the naked eye. In general, amounts of from 2 to 60 percent by weight will be used, usually dependant on the specific gravity of the microspheres. With hollow glass spheres or polymeric spheres, amounts of from 2 to 10 weight percent will preferably be used, and with solid glass or ceramic microspheres 10 to 60 weight are preferred. Mixtures of the various types of microspheres can be used and the amount added will in general be governed by the composite specific gravity of the mixture. Where the compositions include polymeric microspheres, the microspheres should be made of a polymer that is insoluble in the solvents employed in the composition, for example they can be made from polyethylene, polypropylene or a thermoset acrylic polymer.

The following Examples are given by way of illustration only. All parts are by weight unless stated otherwise.

EXAMPLE 1

| | |
|---|---|
| PVC paste-grade homopolymer | 30.0 |
| di-(2-Ethylhexyl) phthalate | 38.0 |
| Stabilizer | 1.0 |
| Barium sulfate | 9.0 |
| Aluminum paste | 16.0 |
| Hollow glass microspheres (glass bubbles E22x-3M Co. Ltd. - average diameter 30 micron, wall thickness 0.5-2.0 micron) | 6.0 |

The ingredients were blended on a suitable stirrer so that the temperature remained below 40° C. to form a screen printing ink composition. The composition was applied to a substrate previously printed with various characteristics using a Siemens Laser Printer. The composition was then gelled by heating for 5 seconds using an Industrial Hi-dry short wave IR dryer (principal wavelength 1.2 microns). The resultant film was opaque and abrasion-removable, and it obscured the embossing of the surface caused by the underlying laser print.

EXAMPLE 2

| | |
|---|---|
| Buta-1,3-diene/styrene copolymer elastomer | 14.0 |
| C-9 aromatic solvent | 50.0 |

These were mixed and the elastomer was allowed to dissolve. Then were added:

| | |
|---|---|
| Calcium carbonate | 12.0 |
| Aluminum paste | 18.0 |
| Polymeric spheres (Lanco wax A1610 from Capricorn Chemicals Ltd. - weight average particle size 30 microns) | 6.0 |

The composition was screen printed on to a substrate as in Example 1, and dried for 20 seconds by passing it through a hot air drier set at 60° C. The resulting mask was opaque and abrasion-removable, and it obscured the embossing of the substrate surface caused by the underlying laser print.

EXAMPLE 3

| | |
|---|---|
| Buta-1,3-diene/styrene copolymer elastomer | 9.0 |
| C-9 aromatic solvent | 32.0 |

These were mixed and the elastomer was allowed to dissolve. Then were added:

| | |
|---|---|
| Calcium carbonate | 8.0 |
| Aluminum paste | 11.0 |
| Solid glass microspheres (Spheriglass 3000 CPO3-Potters Ballotini - weight average particle size 60 microns) | 40.0 |

The above mixture formed a screen printable composition which was printed on to a board that had previously been printed with various indicia using an electromechanical dot-matrix printer. The composition was dried for 20 seconds by passing it through a hot air drier set at 60° C. The resulting mask was opaque and abrasion-removable, and it obscured the defects in the surface caused by the electromechanical dot-matrix printer.

EXAMPLE 4

| | |
|---|---|
| Water | 16.5 |
| Defoamer | 2.0 |
| Polyethylene glycol | 2.0 |
| Surfactant (Pentrone A4D - ABM Chemicals) | 1.0 |
| Hydroxyethyl cellulose | 2.0 |

The above were blended in a suitable stirrer and thereafter were added:

| | |
|---|---|
| Titanium dioxide | 40.0 |
| Hollow glass microspheres (E22x from 3M) | 6.0 |
| Stirring was continued until the pigment was dispersed, and thereafter were added: | |
| Polyurethane emulsion (Witcobond 740 - Baxenden Chemical Company Ltd) | 30.0 |
| Black aqueous pigment dispersion | 0.5 |
| Ethanolamine | to pH 8.5 |

The above formed a screen printable composition which was printed on a board as in Example 3. The composition was dried for 20 seconds by passing it through a hot air drier at 60° C. The resulting composition was opaque and abrasion-removable, and it obscured the depressions in the surface of the substrate.

EXAMPLE 5

| | |
|---|---|
| Buta-1,3-diene/styrene compolymer | 12.0 |
| Xylene | 24.0 |
| Aliphatic hydrocarbon (Shellsol T - Shell Chemicals) | 20.0 |
| Barium sulphate | 16.0 |
| Aluminum paste | 14.0 |
| Polymeric Spheres (Lanco Wax A1611 from Capricorn Chemicals Ltd) | 8.0 |
| Pigment (Chromophthal Yellow 3GDOP - Ciba Geigy) | 5.0 |
| Pigment (Chromophthal Orange 4RDOP - Ciba Geigy) | 1.0 |

The above composition was printed on to a substrate as in Example 1, the resultant mask being gold colored and having a low residual odour to enable the inclusion of finished prints in secondary food or tobacco products. The resulting mask was abrasion-removable and it obscured the underlying laser print.

I claim:

1. A composition adapted for forming an abrasion-removable mask on a lottery ticket, the composition including a coating material is selected from group consisting of a heat-gellable plastisol, a pigmented polymer solution and a pigmented aqueous emulsion said coating material being of the type which can be applied to the lottery ticket to cover at least a portion thereof and said coating being removable after being coated on to the ticket by means of abrasion whereby the covered portion of the card may be exposed upon rubbing; and said coating further including a texture-modifying amount of microspheres in the amount of from 2 to 60 weight percent based on the gelled or dried weight of the composition and said microspheres are selected from the group consisting of glass and ceramic material.

2. A composition according to claim 1, wherein the microspheres have a weight average particle size of less than 120 microns.

3. A composition according to claim 1, wherein the pigmentary material includes a metallic pigment.

4. A composition according to claim 1, wherein the pigmentary material includes an insoluble dyestuff.

5. A composition according to claim 1, wherein the pigment includes an inert, non-coloring extender.

6. The composition of claim 1, wherein the aqueous emulsion is an emulsion of an elastomeric polymer.

7. The composition of claim 1, wherein the polymer solution is a solution of an elastomer.

8. A substrate having an abrasion removable mask thereon wherein the mask has been formed from a composition according to claim 1.

9. A substrate according to claim 8, in the form of a lottery ticket.

* * * * *